US011095564B2

(12) United States Patent
Alwakeel et al.

(10) Patent No.: US 11,095,564 B2
(45) Date of Patent: Aug. 17, 2021

(54) MULTIPLE-ATTRIBUTES CLASSIFIERS-BASED BROADCAST SCHEME FOR VEHICULAR AD-HOC NETWORKS

(71) Applicants:Sami Saleh Alwakeel, Riyadh (SA); el-Hadi Mohamed Aggoune, Brier, WA (US); Agung Budi Prasetijo, Central Java (ID); Hesham Abdulaziz Al-Twaijry, Riyadh (SA)

(72) Inventors: Sami Saleh Alwakeel, Riyadh (SA); el-Hadi Mohamed Aggoune, Brier, WA (US); Agung Budi Prasetijo, Central Java (ID); Hesham Abdulaziz Al-Twaijry, Riyadh (SA)

( * ) Notice: Subject to any disclaimer, the term of this patent is extended or adjusted under 35 U.S.C. 154(b) by 0 days.

(21) Appl. No.: 16/660,459

(22) Filed: Oct. 22, 2019

(65) Prior Publication Data
US 2020/0296047 A1  Sep. 17, 2020

Related U.S. Application Data

(60) Provisional application No. 62/748,828, filed on Oct. 22, 2018.

(51) Int. Cl.
*H04W 4/06* (2009.01)
*H04W 4/40* (2018.01)
(Continued)

(52) U.S. Cl.
CPC .......... *H04L 47/2441* (2013.01); *H04W 4/06* (2013.01); *H04W 4/40* (2018.02); *H04W 24/08* (2013.01); *H04W 28/0289* (2013.01)

(58) Field of Classification Search
None
See application file for complete search history.

(56) References Cited

U.S. PATENT DOCUMENTS 7,885,285 B2 * 2/2011 Fukuyama ............ H04W 40/02
370/428
10,827,327 B2 * 11/2020 Wang .................. H04L 12/1854
(Continued)

OTHER PUBLICATIONS

Aggoune et al., Use of Artificial Neural Networks in a Dispatcher Training Simulator for Power System Dynamic Security Assessment, Jan. 1, 1990.
(Continued)

*Primary Examiner* — Duc T Duong
(74) *Attorney, Agent, or Firm* — Malloy & Malloy, P.L.

(57) ABSTRACT

A multiple-attributes, classifiers-based, broadcast scheme for use in vehicular ad-hoc networks may be employed to assess numerous attributes in order to accurately and effectively determine an appropriate rebroadcast decision for a message received by a vehicle. Various schemes may be employed, comprising one classifier module, or a plurality of classifier modules used in parallel and in accordance with a combination rule function, to effectively examine the attributes contained within a received message and select an appropriate rebroadcast decision, thereby increasing the performance of the vehicular ad-hoc network as a whole. The performance of the broadcast scheme may further be analyzed in a simulation, whereby certain values, such as probability values to be used in the broadcast scheme, may be determined.

16 Claims, 9 Drawing Sheets

(51) Int. Cl.
*H04W 28/02* (2009.01)
*H04L 12/851* (2013.01)
*H04W 24/08* (2009.01)

(56) References Cited

U.S. PATENT DOCUMENTS

| | | | |
|---|---|---|---|
| 2009/0122738 A1* | 5/2009 | Chen | H04L 12/189 |
| | | | 370/312 |
| 2011/0044172 A1* | 2/2011 | Yim | H04L 69/321 |
| | | | 370/236 |
| 2011/0128902 A1* | 6/2011 | Guo | G08G 1/161 |
| | | | 370/312 |
| 2012/0003921 A1* | 1/2012 | Scopigno | G08G 1/161 |
| | | | 455/3.01 |
| 2012/0217933 A1 | 8/2012 | Abe et al. | |
| 2014/0002003 A1 | 1/2014 | Kim | |
| 2014/0009117 A1 | 1/2014 | Ishii et al. | |
| 2014/0021924 A1 | 1/2014 | Abe et al. | |
| 2014/0077595 A1 | 3/2014 | Kakuya et al. | |
| 2014/0152100 A1 | 6/2014 | Lim | |
| 2015/0310742 A1* | 10/2015 | Albornoz | G08G 1/096716 |
| | | | 340/905 |
| 2016/0079755 A1 | 3/2016 | Triebel et al. | |
| 2016/0226268 A1 | 8/2016 | Okui | |
| 2017/0093187 A1 | 3/2017 | Park et al. | |
| 2019/0246385 A1* | 8/2019 | Lin | H04W 72/044 |
| 2020/0169090 A1 | 5/2020 | Aggoune et al. | |

OTHER PUBLICATIONS

Albalawi et al., Energy Warehouse—A New Concept for NEOM Mega Project, Jan. 1, 2019.
Aumann et al., Game Theoretic Analysis of a Bankruptcy Problem from the Talmud, Aug. 27, 1984.
Bayindir et al., The Path of the Smart Grid—The New and Improved Power Grid, Jan. 1, 2016.
Valentin A. Boicea, Energy Storage Technologies: The Past and the Present, Nov. 11, 2014.
Degefu et al., Power Allocation among Socio-economic Sectors with Overlapping Demands during Power Shortae: A Bankruptcy Approach, Jan. 1, 2016.
Jamali et al., Energy storage systems and their sizing techniques in power system—A review, Jan. 1, 2015.
Mashhour et al., The Opportunities for Future Virtual Power Plant in the Power Market, a View Point, Jan. 1, 2009.
Samin Rastgoufard, Applications of Artificial Intelligence in Power Systems, May 18, 2018.
Lloyd S. Shapley, The Shapley Value, Jan. 1, 1988.
Yu et al., A Review on Microgrid Technology with Distributed Energy, 2017 International Conference on Smart Grid and Electrical Automation (ICSGEA) Changsha, pp. 143-146, Jan. 1, 2017.
Zhou et al., Research Review on Electrical Energy Storage Technology, Jan. 1, 2017.

* cited by examiner

| Attribute | Range | Probability |
|---|---|---|
| sender-receiver distance | 0.00 – 0.44 | 0.3 |
| | 0.45 – 0.64 | 0.5 |
| | 0.65 – 1.00 | 0.8 |
| neighboring density | 0.00 – 0.14 | 0.8 |
| | 0.15 – 0.44 | 0.5 |
| | 0.45 – 1.00 | 0.3 |
| speed difference | 0.00 – 0.54 | 0.3 |
| | 0.55 – 0.74 | 0.5 |
| | 0.75 – 1.00 | 0.8 |
| message copies heard | 1 – 4 | 0.8 |
| | 5 – 6 | 0.5 |
| | ≥ 7 | 0.1 |
| directional conformity | true | 0.4 |
| | false | 0.6 |

| Items | Value | notes |
|---|---|---|
| Trip Generator | random | random trip generator |
| number of traffic light | 6 | number of traffic light installed |
| maximum number of lane | 4 | maximum lanes of the road |
| separation of directions | true | physically separates traffic in a road |
| cluster density 'downtown' | 0.00004 | populated density roads |
| cluster density 'residential' | 0.00005 | medium density roads |
| cluster density 'suburban' | 0.00001 | sparse density roads |
| minimum stay | 5.0 | minimum initial stay in seconds |
| maximum stay | 30 | maximum initial stay in seconds |
| minimum speed | 8.33 | minimum speed in $m/sec$ |
| maximum speed | 13.89 | maximum speed in $m/sec$ |
| minimum deceleration | 0.9 | minimum deceleration in $m/sec^2$ |
| maximum acceleration | 0.6 | maximum acceleration in $m/sec^2$ |

Fig. 8

| Parameters | Value |
|---|---|
| MAC type | 802.11 |
| Routing protocol | Message passing (DumbAgent) |
| Bandwidth | 10 Mbps |
| Interface queue type | Queue/DropTail/PriQueue |
| Radio propagation | Two ray ground |
| Antenna model | Omnidirectional |
| Transmission range | 250 meters |
| Network density (n) | 50 – 175 vehicles |
| Simulation time | n+30 seconds |

Fig. 9

MULTIPLE-ATTRIBUTES CLASSIFIERS-BASED BROADCAST SCHEME FOR VEHICULAR AD-HOC NETWORKS

CLAIM OF PRIORITY

The present application is a non-provisional patent application which claims priority pursuant to 35 U.S.C. Section 119(e) to a prior filed provisional patent application, namely, that having Ser. No. 62/748,828 filed on Oct. 22, 2018, the contents of which is incorporated herein by reference in its entirety.

BACKGROUND OF THE INVENTION

Field of the Invention

The present disclosure is directed to a multi-attribute classifiers-based decision making scheme aimed towards preventing the broadcast storm problem on vehicular ad-hoc networks and improving the vehicular network broadcasting channel throughput.

Description of the Related Art

A vehicular ad-hoc network ("VANET") consists of groups of moving and/or stationary vehicles connected by a wireless network. Although VANETs are traditionally used in the context of providing safety and comfort to drivers in a vehicular environment, recent developments have seen VANETs applied in a variety of information-driven applications such as, for example, traffic information systems, whereby VANET communication may provide up-to-the-minute obstacle reports from one vehicle to the next.

The application of VANET systems in this information-driven context provides a great benefit, as additional information may help inform drivers, and perhaps smart vehicles themselves, of various upcoming hazards. However, application of a VANET in these contexts presents a number of challenging characteristics.

For instance, the potentially large scale of application and the high mobility of vehicles may cause issues in VANET's performance. Moreover, the tendency for these factors to fluctuate according to discrete time intervals further causes issues. For example, the scale of a VANET's application, or in other words the vehicular density of the network, may change as traffic waxes and wanes, thereby affecting a vehicle's ability to communicate with another vehicle at a discrete time interval. Likewise, the mobility of vehicles leads to a dynamic network topology, which may cause certain vehicles to fluctuate between states of connection and disconnection.

A variety of measures may be used to determine the effectiveness of a particular VANET system. Such measures may include the reachability of the vehicles in the network, the delay between the receipt and subsequent submission of a message, and the number of times a duplicate message is received by a given vehicle.

Prior attempts to employ a VANET system in accordance with the aforementioned applications has failed to effectively meet requisite standards for such measures. Particularly, the prior VANET attempts are susceptible to a decrease in performance when employed in higher density networks.

The issues in the performance of prior VANET systems commonly manifest as at least one of the following problems. First, it is possible the vehicular network broadcasting channel throughput will be affected as a result of a decrease in performance. Accordingly, as the broadcasting channel throughput is reduced, various problems may arise such as an inability to process the information at the necessary speed leading to long periods of delay and possibly message loss.

A second issue which may arise due to a failure in VANET performance is the broadcast storm problem, which results from a network system overwhelmed by continuous broadcast traffic. Specifically, as broadcast devices continue to send and resend data traffic, a broadcast loop may arise and subsequently consume all available bandwidth. In many cases, a broadcast storm may lead to the failure of the network as a whole.

Accordingly, there is a need for greater VANET performance, specifically with relation to the aforementioned performance measurements, and particularly when the VANET is employed in a higher density network in order to avoid the recurring problems of a decrease in vehicular network broadcasting channel throughput and the broadcast storm problem.

SUMMARY OF THE INVENTION

Some or all of the above needs and/or problems may be addressed by various embodiments of the disclosure. Certain embodiments may include devices and methods for selecting a recipient of a rebroadcast message, from a message sender, for a plurality of neighboring vehicles. Additionally, certain embodiments may include a method for simulating the application of a VANET system in order to analyze the performance thereof and to determine appropriate factors to be used in connection with the VANET system.

According to at least one embodiment of the disclosure, a multiple-attributes, classifier-based, broadcast scheme ("MACB") for vehicular ad-hoc networks provides a method to select a recipient of a rebroadcast message, from a message sender, for a plurality of neighboring vehicles to maintain the needed broadcasting channel Quality of Service. Such neighboring vehicles are characterized by having numerous attributes that need to be evaluated, including, but not limited to: the sender-to-receiver distance; the neighboring vehicular density; the number of duplicated messages received; the relative speed to sender; and the relative movement direction to sender. Accordingly, based on an optimum combination of at least the aforementioned attributes, one or more neighboring vehicles may comprise the best candidate for transmission of a rebroadcast message. Therefore, the broadcast scheme must continuously assess all attributes to determine who should be the recipient of a rebroadcast message whenever a given vehicle receives a new message through the vehicular network.

Specifically, in at least one embodiment a multi-classification scheme for assessing a collective set of local attributes (one-hop neighbor information) may be used to make a correct determination of a recipient of a rebroadcast message. In at least one embodiment, the attributes may include: sender-to-receiver distance; neighboring vehicle density, the relative speed to sender; the relative movement direction to sender; and the number of duplicate messages received. Further, a delay module may be incorporated to determine the number of duplicate messages received and to alter the assessment of the set of local attributes. The multi-classification scheme may then utilize a plurality of intelligent classifiers to examine such attributes. The outcomes of the classifiers may further be joined according to at least one of a plurality of rule functions, to make a final intelligent rebroadcast decision.

Alternatively, in a different embodiment, a single classification scheme may be utilized whereby one intelligent classifier is used to examine such attributes. Accordingly, the output from the intelligent classifier is used to make a final intelligent rebroadcast decision.

In at least one further embodiment, a simulation may be structured and performed so as to analyze the performance of the MACB broadcast scheme utilized. The simulation may build a realistic scenario featuring mobility, topography, and a mobility trace for each of a plurality of test vehicles. The simulation may further propagate and receive at least one message between the plurality of test vehicles before further redistributing the received message according to the classification scheme used. Accordingly, performance of the classification scheme may be measured according to a plurality of performance measures, including, but not limited to: message reachability, saved-rebroadcast, message latency, and message delivery cost factor. Furthermore, specific probability values, for use in conjunction with other embodiments of the disclosure, may be determined according to the performed analysis.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Illustrative embodiments of the disclosure will now be described more fully hereinafter with reference to the accompanying drawings in which some, but not all, embodiments of the disclosure are shown. The disclosure may be embodied in many different forms and should not be construed as limited to the embodiments set forth herein; rather, these embodiments are provided so this disclosure will satisfy applicable legal requirements.

Figure 1:
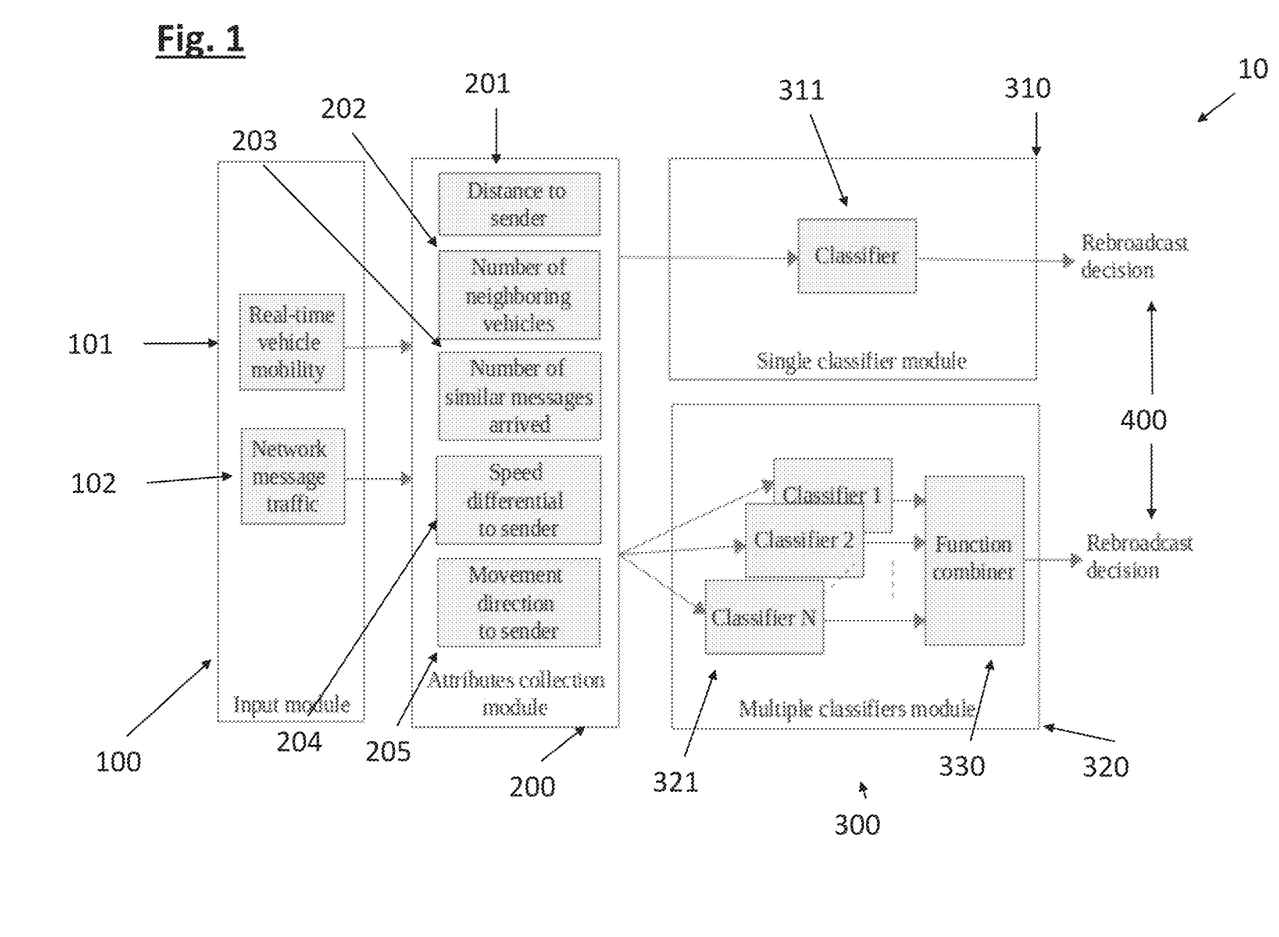
FIG. 1 depicts a systematic diagram of an embodiment of the disclosure.
Figure 2:
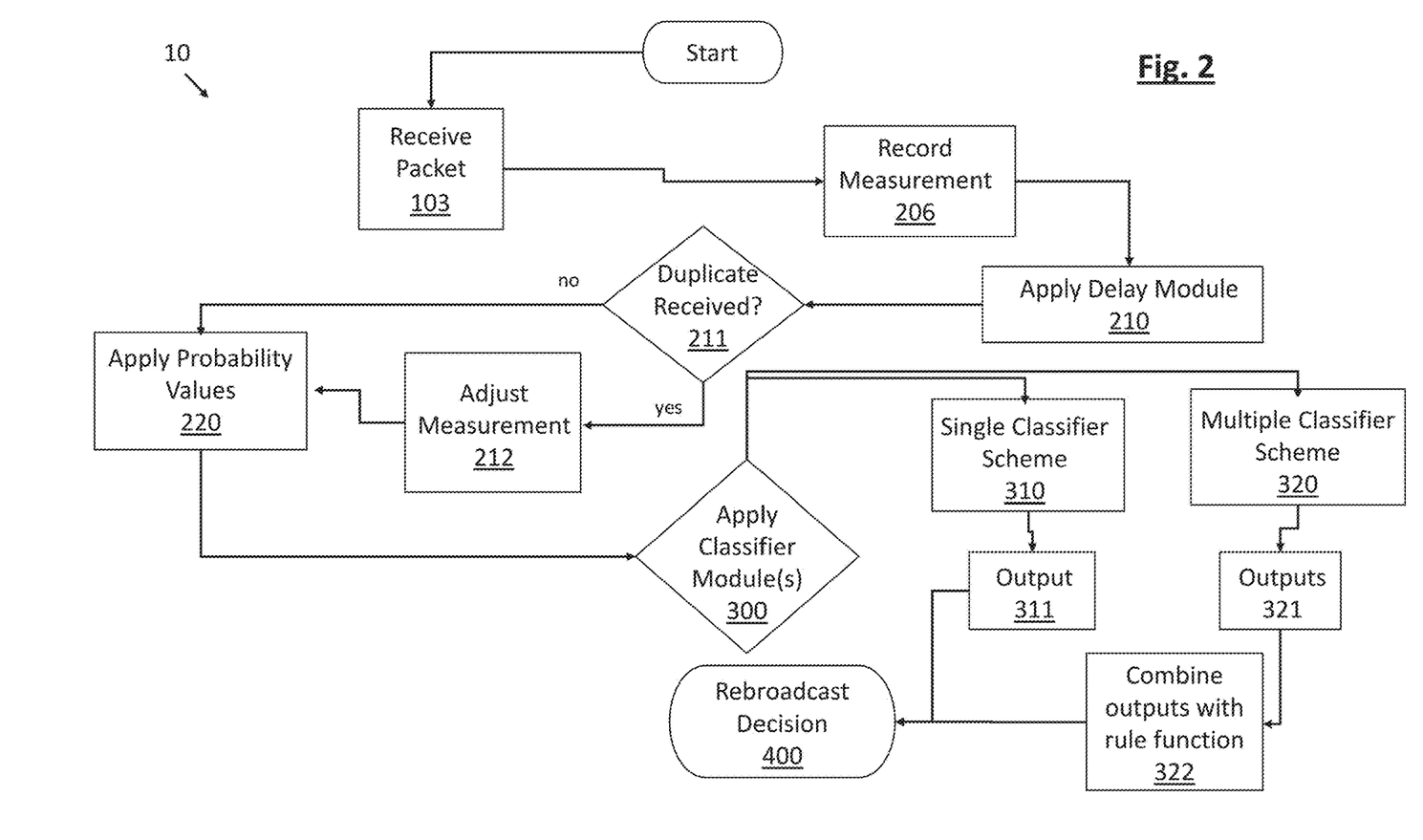
FIG. 2 depicts an exemplary flow diagram of a method used in accordance with the embodiment disclosed in FIG. 1.

Depicted in FIGS. 1 and 2 is a multiple-attributes, classifiers-based broadcast scheme 10 block diagram. As can be seen, upon receipt of a packet or message 100, each vehicle will individually access all current attribute values, or parameters, at the attributes collection module 200. The scheme may then convert these values into predefined probability values 220, which may in at least one embodiment, be determined according to a simulation model 500. The classification module may subsequently process 300 probability values and output a rebroadcast decision 400.

The input module 100 contains two different entities: real-time vehicle mobility 101 and network message traffic parameters 102. The vehicle mobility 101 accounts for vehicular motion constraints such as: the road characterization (e.g. traffic flow, number of road lanes and physical separation of opposite traffic flow), speed limits and intersection crossing rules such as stop signs or traffic lights. As the density of the vehicle on roads varies with time, the vehicle mobility 101 parameters may also vary at different times and locations.

Messages or packets are generated from vehicles on the roads or from RSUs infrastructure. A message can be broadcast once by an on-board unit (OBU) installed on a vehicle, or it may be often broadcast repeatedly for a specific period of time when the message is considered as urgent. The message may be important to a specific geographical area only (e.g. curved road warning), or it may be of importance to every vehicle in town (e.g. weather alert). Generated packets may also have different lifetimes. A still image, for example, may have a longer validity time, but a frame from a video-related application has less than a second validity. Therefore, message broadcast will be dependent on the characteristics of the message. The traffic entity may input various network message traffic 102 characteristics such as an account of message replication, the type of message class (message urgency), and message validity (according to both area and lifetime).

Pursuant to receipt of a message or packet, a vehicle must subsequently handle the attributes enclosed therein. Accordingly, within the attribute collection module 200, when a new message is received, the vehicle will record the relevant attributes as a prior measurement 206, including the distance from the sending vehicle 201, the relative speed to sender 204 (speed differential), the relevant movement direction of the vehicles 205, the neighboring vehicular density 202.

Following recordation of the relevant attributes, the vehicle may apply a delay module 210, or a "Random Assessment Delay" ("RAD") wherein the vehicle applies a time frame, which may be randomly determined, in which the vehicle waits for the receipt of a duplicate message 211. If a duplicate message 211 is received during the time frame, then the vehicle adjusts the prior measurement into a subsequent measurement 212, which includes at least recalculating the distance from the sending vehicle 201, and the relative speed to sender 204. The vehicle will subsequently record the shortest distance 201 and lowest speed 204 experienced during the RAD time period. The number of duplicate messages 203 received during the RAD time period will also be recorded.

When applicable, the scheme may normalize various attributes. For example, the distance from the sending vehicle 201 may be obtained by normalizing the attribute to the vehicle's radio range. Likewise, the neighboring vehicular density 202 and the relative speed to sender 204 may be normalized to the highest values respectively recorded by the vehicle. For the relative movement direction attribute 205, a binary value may be assigned to represent the forward and backward movement as compared to the sender's direction. Normalization is not applied to the number of duplicates 203. All attributes will be introduced to the attributes collection module 205 as primary features, meaning, the attributes collection module 205 will use the input information directly, with or without normalization.

Figure 3:
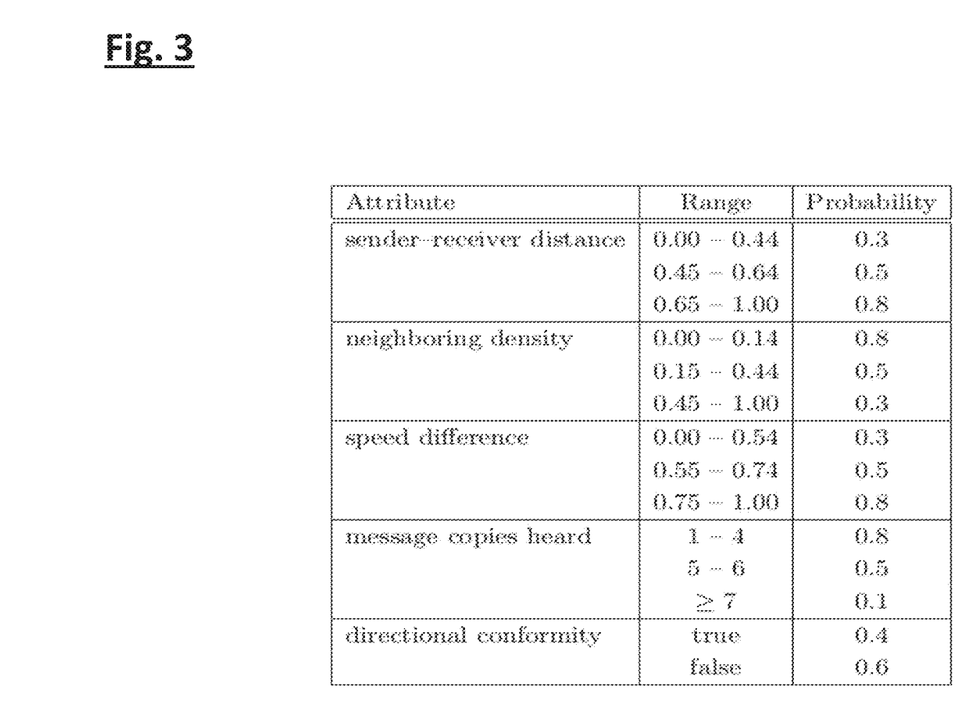
FIG. 3 depicts an exemplary probability assignment table to be used in accordance with the method disclosed in FIG. 2.

In order to assign more probabilities to potential vehicles for message rebroadcast, a probability differentiation 220 is applied to either the prior measurement 206 or the subsequent measurement, 212 depending on the receipt of duplicate messages 211 during the delay module 210, or RAD. An example of probability values to be assigned to the attributes is shown in FIG. 3. It should be noted these values are subjective and may be modified according to simulations and experimentations. The output of the attributes collection module 200 is the probability values for each attribute.

With further reference to FIGS. 1 and 2, it may be seen that subsequent to the output of the probability values by the attributes collection module 200, the probability values will be examined according to at least one classifier module 300. The MACB scheme assumes all the classifiers are trained a priori. The training data is adopted from the probability assignment as shown in FIG. 3. Accordingly, multiple experiments are not needed to obtain training data for the classifier modules as fixed probability values have already been defined for each attribute.

Figure 4A:
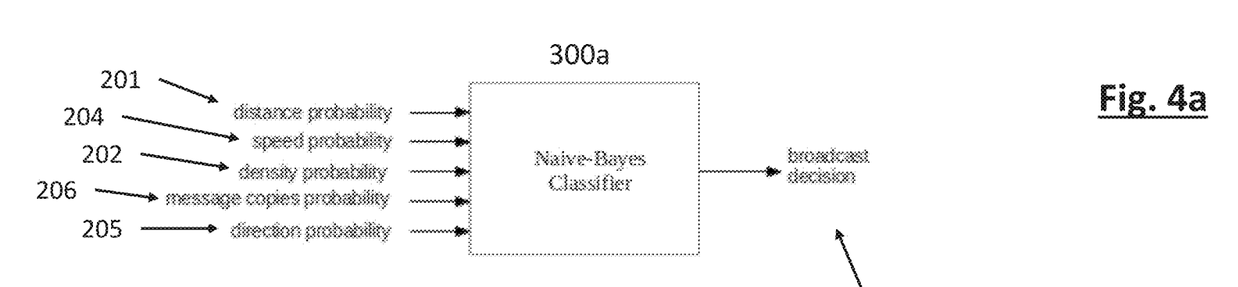
FIG. 4a depicts a naïve-Bayes classifier to be used in various embodiments of the disclosure.
Figure 4B:
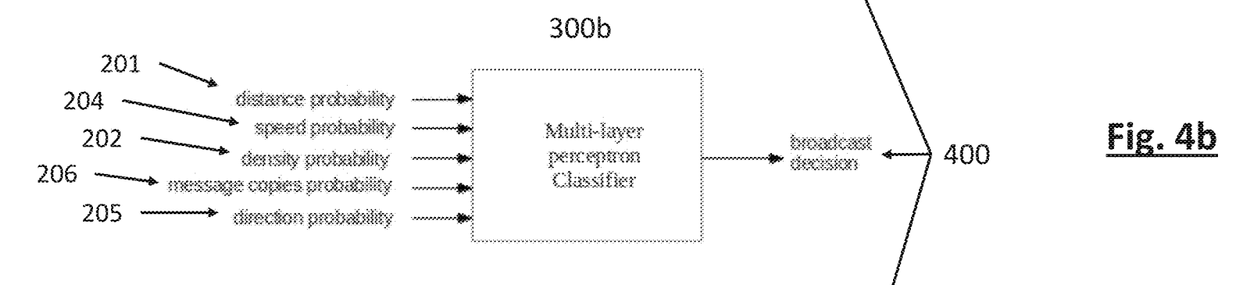
FIG. 4b depicts a Multi-Layer Perceptron classifier to be used in various embodiments of the disclosure.
Figure 4C:
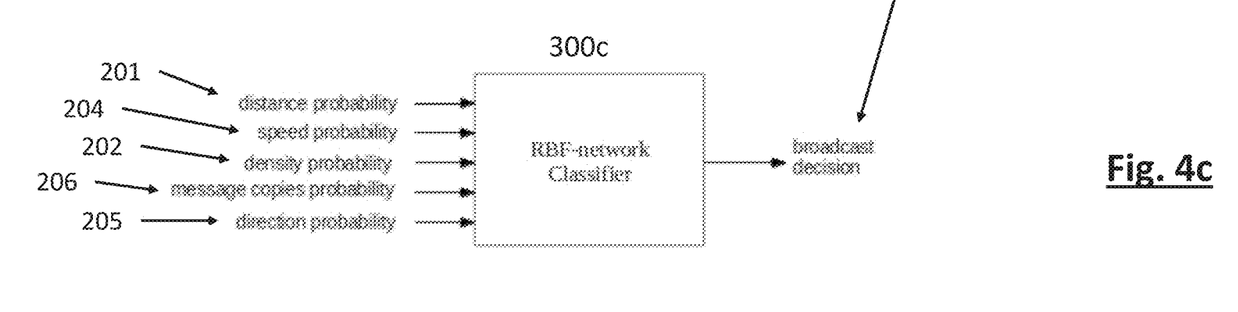
FIG. 4c depicts a RBF-Network classifier to be used in various embodiments of the disclosure.

As further seen in FIGS. 1 and 2, at least one embodiment of the present disclosure may employ a single classifier module 310 in MACB ("MACB-SC") to assess the attributes. The single classifier module 310 may use one intelligent classifier module for the examination of the attributes, wherein the classifier module 311 may comprise: the naïve-Bayes classifier 300a, the Multi-Layer Perceptron classifier 300b, or the RBF-network classifier 300c, as shown in FIG. 4.

In an alternative embodiment, a multiple classifiers module 320 in MACB ("MMACB-MC") may be employed for examination of the attributes. In this embodiment, the naïve-Bayes classifier 300a, the Multi-Layer Perceptron classifier 300b, and the RBF-network classifier 300c may be used in parallel, wherein each module assesses the current conditions of the attributes.

The outputs 321 of the three modules used in parallel will subsequently be combined according to at least one of a plurality of rule functions 330, including, without limitation, unanimity 331, simple-majority 332, distributivity 333, and greatest-average-confidence. Each of these rule functions will be briefly described below.

Figure 5A:
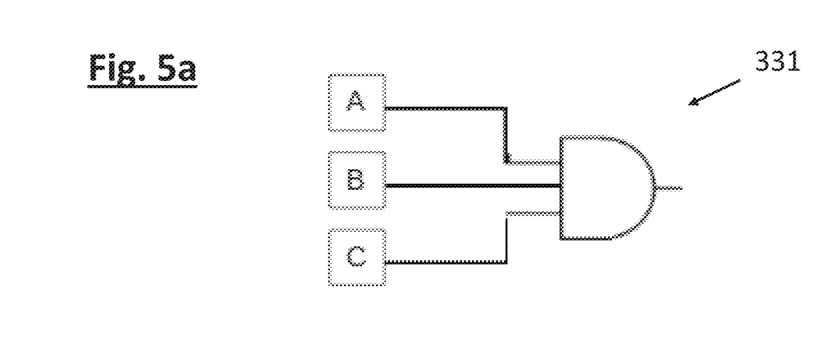
FIG. 5a depicts a logic circuitry for a unanimity combiner to be used in various embodiments of the disclosure, wherein A, B, and C refer to the output of the naive-Bayes, Multi-Layer Perceptron, and RBF-network in any order.

The unanimity 331 rule function combines the class output from the three classifiers and treats them equally in such a way that the rebroadcasting decision 400 is made when all three classifiers output 321 a similar positive rebroadcasting decision 400. The unanimity 331 combiner can be imagined as an AND gate with three inputs as shown in FIG. 5a. Accordingly, it may be understood that the unanimity 331 rule function restricts the use of the naive-Bayes classifier 300a by requiring use of the other two classifiers 300b, 300c.

Figure 5B:
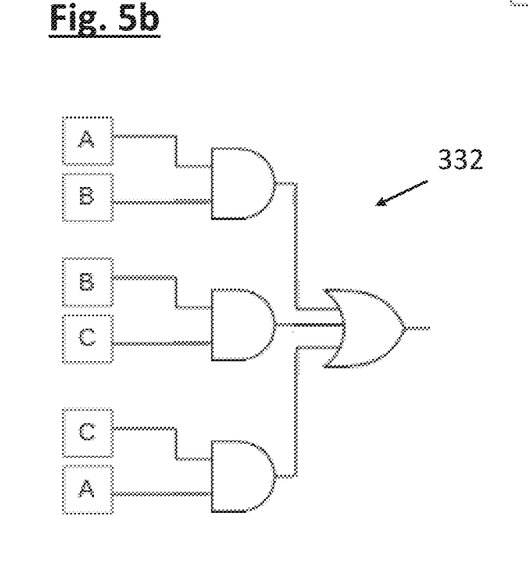
FIG. 5b depicts a logic circuitry for a simple-majority combiner to be used in various embodiments of the disclosure, wherein A, B, and C refers to the output of the naive-Bayes, Multi-Layer Perceptron, and RBF-network in any order.

A simple majority 332 rule function is a vote taken by the combiner that at least two classifiers have the same class outputs 321. The logic of the combiner can be interpreted as using simple logic gates as depicted in FIG. 5b.

Figure 5C:
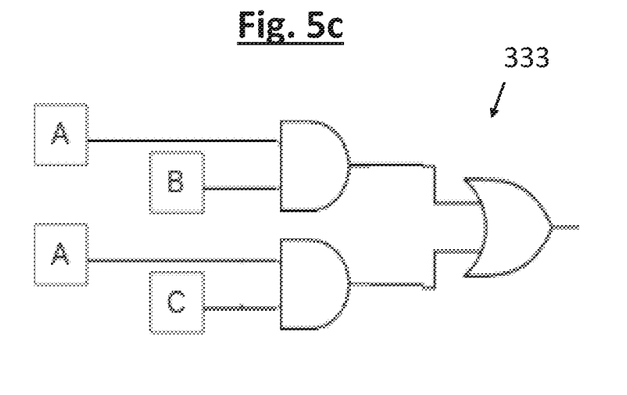
FIG. 5c depicts a logic circuitry for a distributivity combiner to be used in various embodiments of the disclosure, wherein A, B, and C refers to the output of the naive-Bayes, Multi-Layer Perceptron, and RBF-network respectively.

The distributivity 333 rule function attempts to reduce the broadcast suppression by favoring a particular classifier amongst the three classifiers. The negative decision to rebroadcast is made only when the best classifier provides a negative class. The logic of the combiner follows the distributivity property in logic circuits, as depicted in FIG. 5c.

The greater-average-confidence rule function means the redistribution decision will be selected from the averaged confidence probability value for each class, whenever the three classifier outputs 321 have different class values. For example, in the event there are two classifiers that give an output 321 of the same class value, the confidence values of both classifiers will be averaged and compared to the confidence probability value of the other classifier class. The combiner 330 will then select the class having the greatest confidence probability value. For instance, if both classifier A and classifier B output 321 'yes' with the respective confidence probabilities of 0.6 and 0.8, and classifier C outputs 321 "no" with a confidence probability of 0.8, then the combiner 330 will output a "no" decision as the averaged confidence probability of classifier A and B is only 0.7, which is lower than the classifier probability of 0.8 determined by classifier C.

Accordingly, as can be seen in FIG. 2, the classifier 330 output in an embodiment employing a MACB-SC scheme results in the selection of a rebroadcast decision 400. Likewise, in an embodiment employing the MACB-MC scheme, the selection of a rebroadcast decision 400 occurs upon combining the classifier outputs according to a rule function 330.

Figure 6:
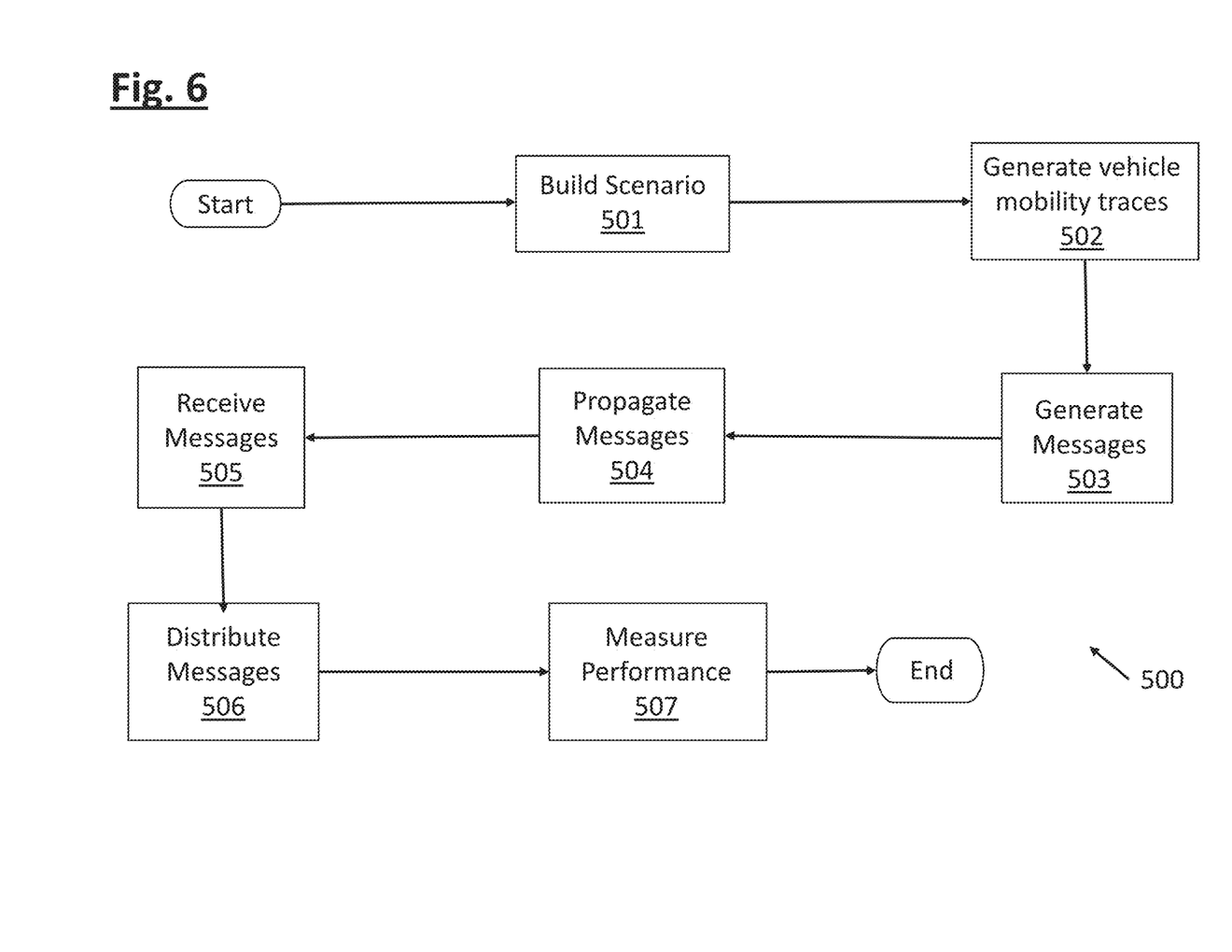
FIG. 6 depicts an exemplary flow diagram for performing a simulation in accordance with at least one embodiment of the present disclosure.

With reference to FIG. 6, disclosed therein is at least one embodiment of the present invention where a simulation 500 may be performed for measuring the performance of a given MACB scheme. Further, the simulation 500 may be used to determine at least one probability value 220 to be applied in a given MACB scheme.

Figure 7:
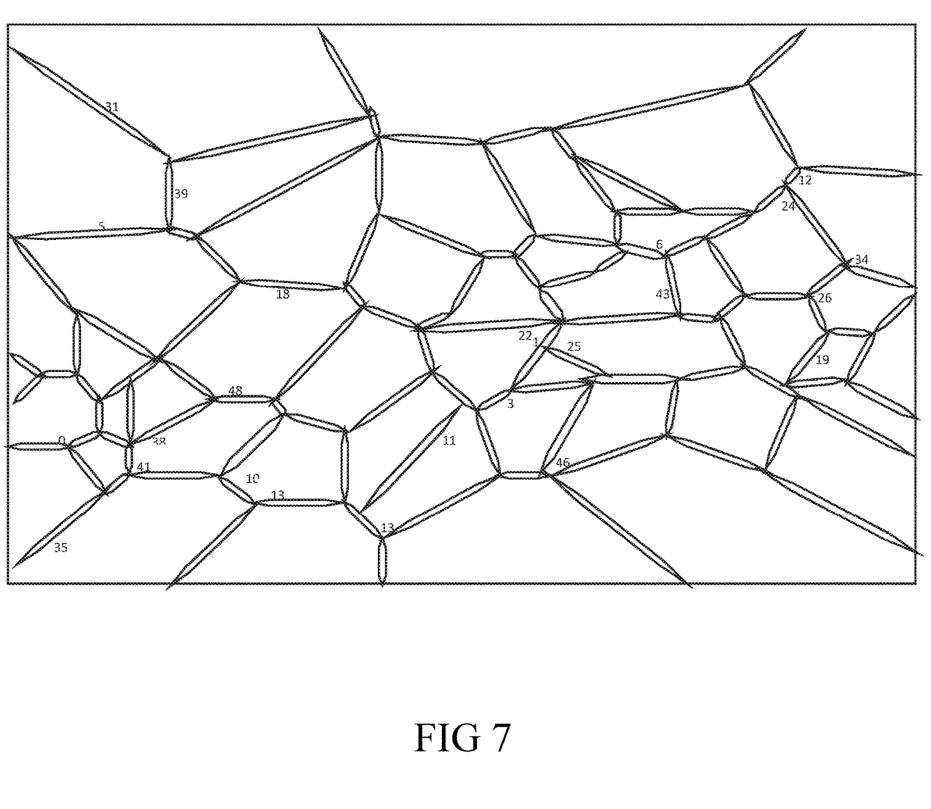
FIG. 7 depicts an exemplary Voronoi diagram of the VANNET 1500 m×1500 m flat area topology with 50 mobile nodes, to be used in accordance with the embodiment disclosed in FIG. 6.

Specifically, a simulation 500 may build a scenario 501. For instance, a 1500 m×1500 m flat area with realistic two-dimensional mobility, provided by a VanetMobiSim mobility generator may be used. The VanetMobiSim mobility generator may generate realistic mobility traces 502 for vehicles, in order to accurately simulate the conditions upon which the MACB may function. As can be seen in FIG. 7, the VanetMobiSim mobility generator may generate a Voronoi diagram with a network density set to a certain level.

Figure 8:
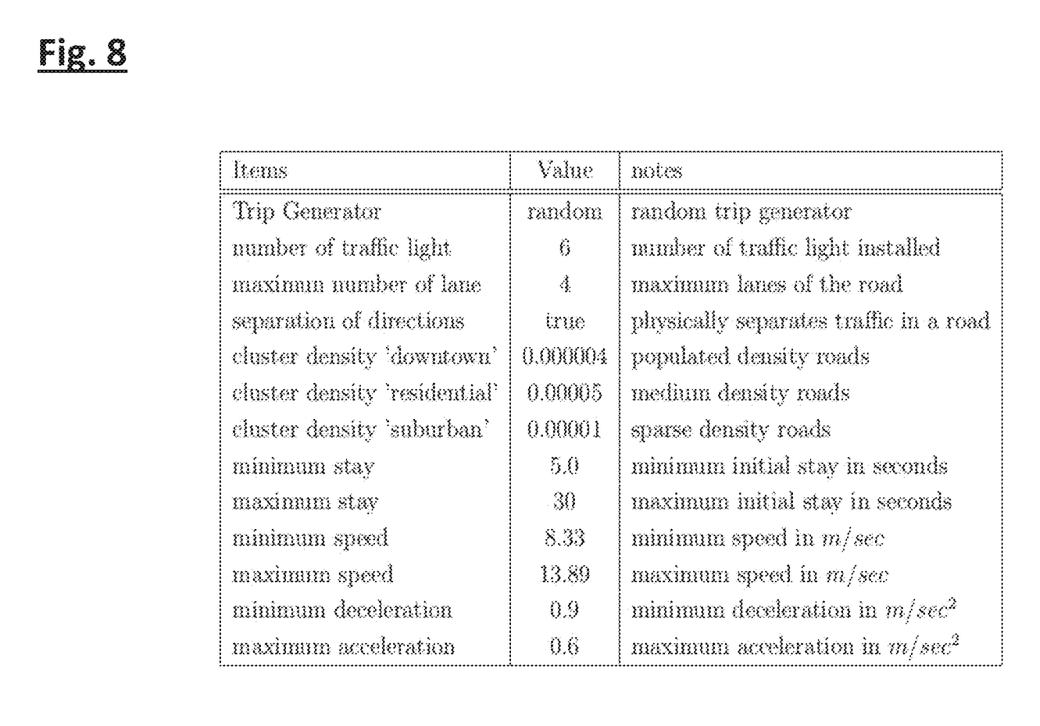
FIG. 8 depicts an exemplary table of configuration settings to be used in accordance with the embodiment disclosed in FIG. 6.

The mobility traces for vehicles 502 may accommodate several traffic lights, acceleration and deceleration, and multiple-lane roads. Moreover, the precise values of the mobility traces for vehicles 502 may be altered according to configuration settings used, as is shown in FIG. 8.

Figure 9:
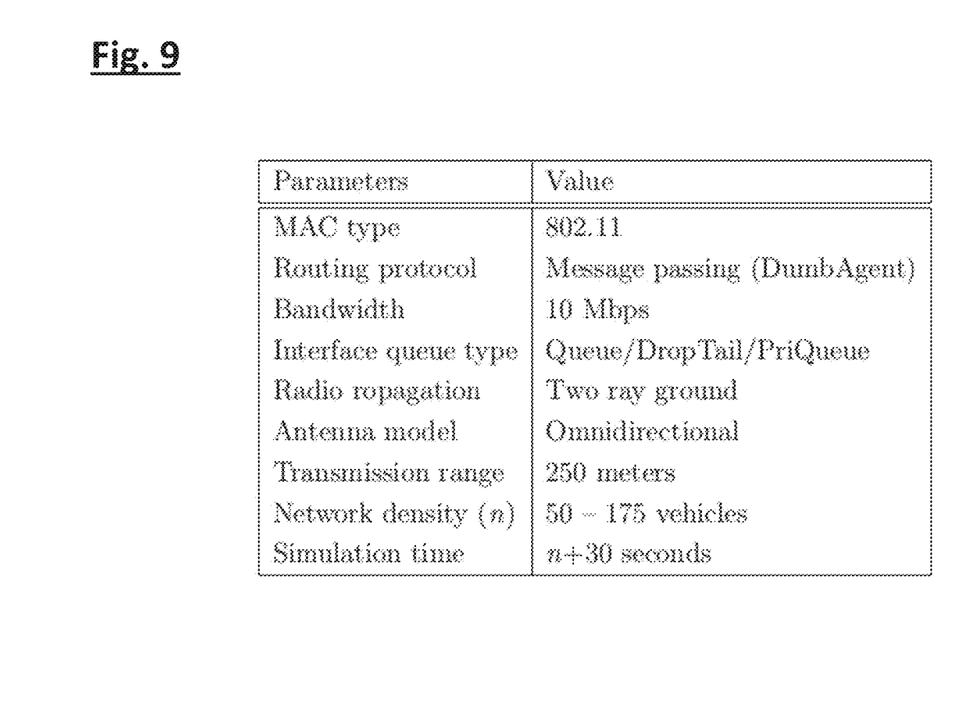
FIG. 9 depicts an exemplary table of parameters settings for the NS-2 network simulator, to be used in accordance with the embodiment disclosed in FIG. 6.

An NS-2 network simulator may be used to simulate the networking functionality based on the mobility traces 502 generated by VanetMobiSim. The setting of the NS-2 can be seen in FIG. 9. Message arrival may be characterized as a Poisson distribution with a rate of 1 message/second. The generated messages 503 may be limited such that every vehicle generates only one message throughout the simulation. Sufficient time may be given so that the last message generated has fully propagated 504 over the network. To facilitate the exchange of control data, beaconing may be set to 200 ms, containing current topological position/location, speed vector and the unique identity of the vehicles. Once a message has been propagated 504, the message will be received 505 and then redistributed 506 according to the MACB scheme 10 being used.

Performance may be measured 507 in the form of a plurality VANET's performance measures, such as message reachability (RE), saved-rebroadcast (SRB), message latency (DLY), message delivery cost factor (DC). As previously stated, evaluation of the aforementioned performance measures may determine whether the relevant MACB scheme 10 is meeting sufficient performance standards to avoid problems such as a reduction in broadcasting channel throughput and incidence of broadcast storm. Moreover, evaluation of the performance measures may further assist in developing ideal probability values for a given MACB scheme 10. Each of these performance measures will be discussed in greater detail below.

Reachability (RE) may be defined as the fraction of vehicles in the network that receive the broadcast message. In other words, reachability comprises the number of vehicles receiving the broadcast message divided by the total number of vehicles that are reachable, directly or indirectly, from the source node. In terms of probability, the reachability is the probability that every two vehicles in the information flow network are connected in a given time interval. The packet reachability probability is representative of network connectivity. The network reachability can then be calculated by averaging the reachability of every message generated during simulation and disseminated over the network.

The saved-rebroadcast (SRB) is the ratio between the number of vehicle hosts receiving the message and the number of hosts actually broadcasting the message. The saved-rebroadcast is calculated as $(r-t)/r$, where r represents the number of vehicles receiving the broadcast message and t is the number of vehicles which broadcast such messages. Therefore, given the same reachability value, when vehicles in a network have smaller average forward probability $t/r$, a higher broadcast saving can be achieved.

The message latency (DLY) comprises the delay in time for a receiving vehicle to receive a message. Because a message may be generated and time-stamped prior to delivery over the network, a plurality of delay values may be calculated for use in determining the message latency or total delay of the scheme, such as: processing delay (time the vehicles take to process the message), queuing delay (time the message spends in routing queues), transmission delay (time it takes to push the message onto the link), and propagation delay (time for a message on the way to reach its destination). Accordingly, the total delay (DLY) may be calculated by averaging the total delay of a message calculated at the receiving vehicles in the network.

The message delivery cost (DC) is a measure of the cost of successfully delivering a message to a vehicle. This is a measure of how many broadcast times and duplicates occur in average, to deliver a message to a vehicle. Both broadcast and duplicates imply the cost that must be paid for a vehicle to receive a message in the ad-hoc network. If a message broadcast reaches many neighboring vehicles that such vehicles hear the message for the first time, the cost is minimal. However, if the neighboring vehicles have such a message in advance, the delivery cost is maximal. The delivery cost of a scheme is calculated as: $(d.t/r)/(m.N)$, where d is the number of message duplicates resulted from the broadcast, m is the number of message generated, N is the available vehicles in the network and $t/r$ is the vehicle's forward probability. Simply stated, the delivery cost is a count of average duplicates that occur for delivering a message to a vehicle within the network with a specific forward probability.

In evaluating the performance of a given a MACB scheme 10, each of the aforementioned performance measures may be evaluated and compared to prior processes and alternate MACB schemes 10. Furthermore, the settings of the simulation may be altered, such as the neighboring vehicle density 202, to more accurately determine how a given MACB scheme 10 may operate throughout the changing conditions it may be subjected to in reality.

Although, as stated previously, determination of a rebroadcast decision 400 and the performance of a particular MACB scheme 10 may depend on the characteristics of the message and the situation in which the MACB scheme 10 is employed, comparisons between the MACB-SC scheme 310 and the MACB-MC scheme 320 have providing some information pertaining to the general performance of the schemes.

First, application of a MACB-SC scheme 310, using any of the aforementioned classifier modules 300, over vehicular ad-hoc networks may typically see a reduction in the delivery cost of various network densities. Additionally, total delay may likewise be reduced.

Similarly, application of a MACB-MC scheme 320, in accordance with any of the aforementioned rule functions 330 may produce an increase in reachability, particularly when the MACB-MC scheme is used in combination with the distributivity 333 rule function. Additionally, a MACB-MC scheme 320 combined with the unanimity 331 rule function, may see an increase in the saved-rebroadcast performance measure and average reachability, even at high vehicle densities. In comparison with MACB-SC schemes 310, the MACB-MC scheme 320 may typically provide firmer broadcast decisions.

With respect to the delivery cost measure, the MACB-MC scheme 320 in combination with any of the rule functions 330 may be characterized as an inverse relationship. Accordingly, the denser the network is, the greater the delivery cost savings are. In other words, the delivery costs may easily be maintained by the MACB-MC scheme 320 across even high density applications.

Accordingly, it can be understood that the MACB-MC scheme 320 is adaptive and may consistently provide substantial broadcast savings, delivery cost saving, and total delay savings. Likewise, the MACB-SC scheme 320 may provide performance boosts in reachability, saved-rebroadcast, delivery costs, and total message delay. Thus, it can be understood application of the aforementioned MACB schemes 10 may positively affect the network performance of VANET and work to prevent problems such as a decrease in a reduction in broadcasting channel throughput and incidence of broadcast storm.

It can be understood that the present invention is not limited to the embodiments described above, but encompasses any and all embodiments within the scope of the following claims.

What is claimed is:

1. A computer-based method for selecting a broadcaster of a message over vehicular ad-hoc networks comprising the steps, to be performed by a processor, of:
   receiving a message comprising a plurality of attributes;
   recording a prior measurement from the plurality of attributes disclosed in the packet;
   performing a delay module, comprising:
      a) applying a time frame for receipt of at least one duplicate packet;
      b) adjusting the prior measurement into a subsequent measurement based on the plurality of attributes in the at least one duplicate packet, upon receipt thereof;
   applying probability values to either the prior measurement or the subsequent measurement, dependent upon the delay module;
   examining the probability values according to at least one classifier module; and
   selecting a rebroadcast decision from an output of the at least one classifier module.

2. The computer-based method of claim 1, wherein the at least one classifier module comprises one classifier module selected from the group consisting of: a naïve-Bayes classifier, a Multi-Layer Perceptron classifier, and a RBF-network classifier.

3. The computer-based method of claim 1, wherein the at least one classifier module comprises at least a naïve-Bayes classifier, a Multi-Layer Perceptron classifier, and a RBF-network classifier used in parallel.

4. The computer-based method of claim 3, wherein the outputs of the at least naïve-Bayes classifier, a Multi-Layer Perceptron classifier, and a RBF-network classifier are, before selecting a rebroadcast decision, combined according to a rule function selected from the group consisting of: unanimity, simple-majority, distributivity, and greatest-average-confidence.

5. The computer-based method of claim 1, wherein the time frame comprises a randomly generated time frame.

6. The computer-based method of claim 1, wherein the message comprises broadcast information including sender-to-receiver distance, neighboring vehicular density, relative speed to sender, and the relative movement direction to sender.

7. The computer-based method of claim 6, wherein the subsequent measurement includes at least the minimum sender-to-receiver distance and the minimum relative speed.

8. The computer-based method of claim 1, wherein the probability values are determined according to a simulation.

9. A machine having a memory, executable by a processor, containing instructions for selecting a broadcaster of a message over vehicular ad-hoc networks, the instructions comprising:
   a first sequence for receipt of a message comprising a plurality of attributes;
   a second sequence for determining a prior measurement from said plurality of attributes;
   a third sequence comprising a delay module, said delay module comprising:
      a) receipt of at least one duplicate packet within a time frame;
      b) adjustment of said prior measurement into a subsequent measurement based on said at least one duplicate message;
   a fourth sequence for applying probability values to either said prior measurement or said subsequent measurement, dependent upon said third sequence;
   a fifth sequence for examining the probability values according to at least one classifier module; and
   a sixth sequence for selecting a rebroadcast decision from the output of said at least one classifier module.

10. The machine of claim 9, wherein said at least one classifier module comprises one classifier module selected from the group consisting of: a naïve-Bayes classifier, a Multi-Layer Perceptron classifier, and a RBF-network classifier.

11. The machine of claim 9, wherein said at least one classifier module comprises at least a naïve-Bayes classifier, a Multi-Layer Perceptron classifier, and a RBF-network classifier used in parallel.

12. The machine of claim 11, wherein said outputs of the at least naïve-Bayes classifier, a Multi-Layer Perceptron classifier, and a RBF-network classifier are, before initiation of said sixth sequence, combined according to a rule function selected from the group consisting of: unanimity, simple-majority, distributivity, and greatest-average-confidence.

13. The machine of claim 9, wherein said time frame comprises a randomly generated time frame.

14. The machine of claim 9, wherein said packet comprises broadcast information including sender-to-receiver distance, neighboring vehicular density, relative speed to sender, and the relative movement direction to sender.

15. The machine of claim 14, wherein said subsequent measurement includes at least the minimum sender-to-receiver distance and the minimum relative speed.

16. The machine of claim 9, wherein said probability values are determined according to a simulation.

* * * * *